United States Patent Office

2,869,130
Patented Jan. 20, 1959

2,869,130

MECHANISMS FOR FEEDING ELECTRONIC COMPONENTS AND THE LIKE

Albert E. Newton, Beverly, Milton H. Roske, Boxford, and John E. Walsh, Beverly, Mass., assignors to United Shoe Machinery Corporation, Flemington, N. J., a corporation of New Jersey Application February 3, 1958, Serial No. 712,821

10 Claims. (Cl. 1—3)

This invention relates to mechanism for feeding successive work pieces provided with terminal projections into predetermined position for mounting or other processing, and it more particularly pertains to means for feeding and installing electronic components of the type having leads which extend in generally parallel or radial relation from corresponding portions of their bodies. Although the invention is herein shown and described as applied to the mounting of disk type capacitors, commonly and hereinafter called "discaps," it is to be noted that use of the invention is not thus limited, nor is it restricted to the particular embodiment herein disclosed by way of illustration.

Mechanical assemblage of electronic equipment on an automatic commercial basis requires, since lead receiving holes afford clearance of only a few thousandths of an inch, a high order of dependable, accurate performance on the part of each of a series of component installing machines. Continually successful operation of these machines has been achieved in the instances where the components themselves have been very uniform in their shape, size and lead straightness. A machine for installing disk type capacitors, for instance, is disclosed in an application Serial No. 561,812, filed January 27, 1956, in the name of John E. Walsh, and has operated satisfactorily in automatic production lines especially where the discaps, which frequently have bodies of molded ceramic material, were held to small physical tolerances. It is found that for economic reasons, however, it is not always practicable to expect precisely uniform components to be available, except at a premium, in increasingly needed quantities. Accordingly, it is essential, particularly when lead insertion must be controlled by means engaging individual component bodies, as in the case of discaps, that reliable automatic feeding means be provided for dependably installing or otherwise processing components having some dimensional tolerance.

In view of the foregoing, it is a primary object of this invention to provide an improved machine for accurately controlling and installing articles such as discaps or the like in consistently reliable operation even though they may vary dimensionally.

In keeping with the object just stated and in accordance with a feature of the invention, there is provided, in a novel machine for mounting articles by their projecting terminals and including cyclically operable inserting means, a hopper for holding a random mass of the articles and having means for positioning the articles successfully at a loading point, a guideway adapted to receive successive article carriers in row formation, a delivery portion of said guideway extending from the vicinity of said point to the vicinity of the operating path of the inserting means and a return portion extending substantially from said path to said point, means for loading the successively positioned articles at said point into successive carriers to be advanced in the delivery portion of the guideway, and means for positioning successively loaded carriers adjacent to the operating path whereby their articles may be transferred thereto prior to the return of the empty carrier. Thus, in lieu of advancing in stacked or mutually contacting (and hence interdependent) relation, the successive articles to be mounted, as disclosed for instance in said Walsh application, and in the component feeding mechanism disclosed in a copending application Serial No. 642,281, filed February 25, 1957, in the name of Albert E. Newton, the present invention avoids the inherent difficulty in thus precisely positioning components, some of the bodies of which may be of non-uniform configuration. That is to say that, for the uncertain positioning and probable jamming of a component which results merely from its being the endmost one of a plurality of regularly and irregularly shaped components in contacting row formation, the present invention contemplates obtaining exact positioning control and continuous feed through the medium of substantially identical carriers adapted similarly to hold the individual components. As herein illustrated, the carriers are preferably of a rectangular shape adapted to receive and contain each work piece, each carrier being formed with an opening generally corresponding to the profile of the work piece.

The above and other features of the invention, including novel details of construction and combinations of parts, will now be described in detail in connection with an illustrative discap mounting machine in which the invention is embodied and with reference to the accompanying drawings thereof, in which.

Figure 10:
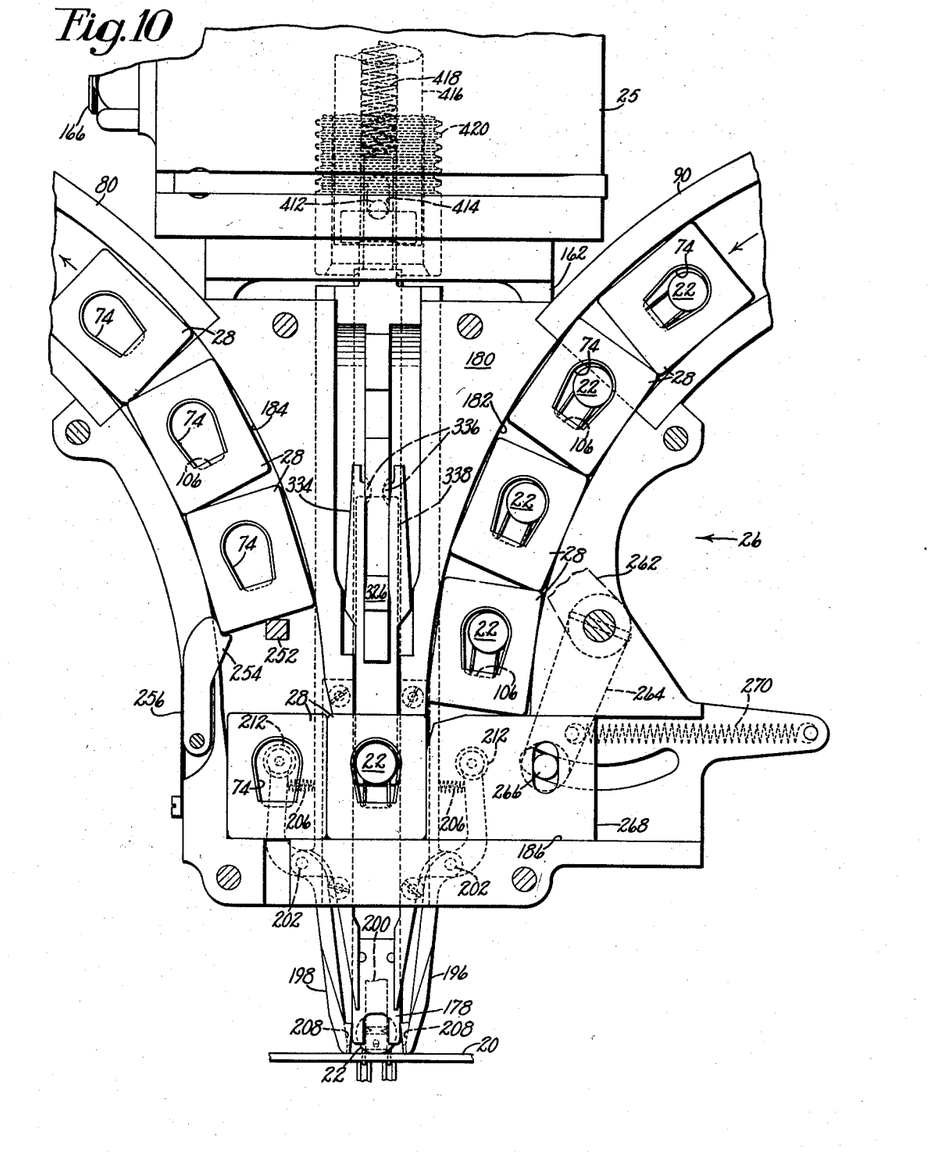
Fig. 10 is a view in front elevation of the head shown in Fig. 9 but at a later stage and with certain parts removed.

Although the illustrative machine is herein shown and described as adapted for operation at a station of a conveyerized assembly line, for instance one of the type disclosed in the United States Letters Patent No. 2,772,416, granted December 4, 1956, upon an application of Adolph S. Dorosz and Thomas W. Snow, it will be understood that the illustrative machine may with minor changes be adapted for independent operation. In either case a work piece, herein represented by a wiring board 20 (Figs. 1, 10 and 14), which is to receive the leads of a component such as a discap 22 (Figs. 4, 10 and 14), will be suitably supported and positioned with respect to the machine by means not herein shown. The illustrative machine comprises a main hollow C-frame 24 (Fig. 1), a vertically disposed hollow casting 25 secured to the frame 24, an inserting head 26 mounted on the lower portion of the casting 25, a plurality of carriers 28 (Figs. 8 and 10) for holding individual discaps, a carrier loading mechanism generally designated 30 (Figs. 3 and 4) carried on the casting for rotation about a vertical axis, means for circulating the carriers in a closed path between the loading mechanism and the inserting head, and control means for correlating the operation of the aforementioned elements in sequence.

Carrier loading mechanism

Figure 3:
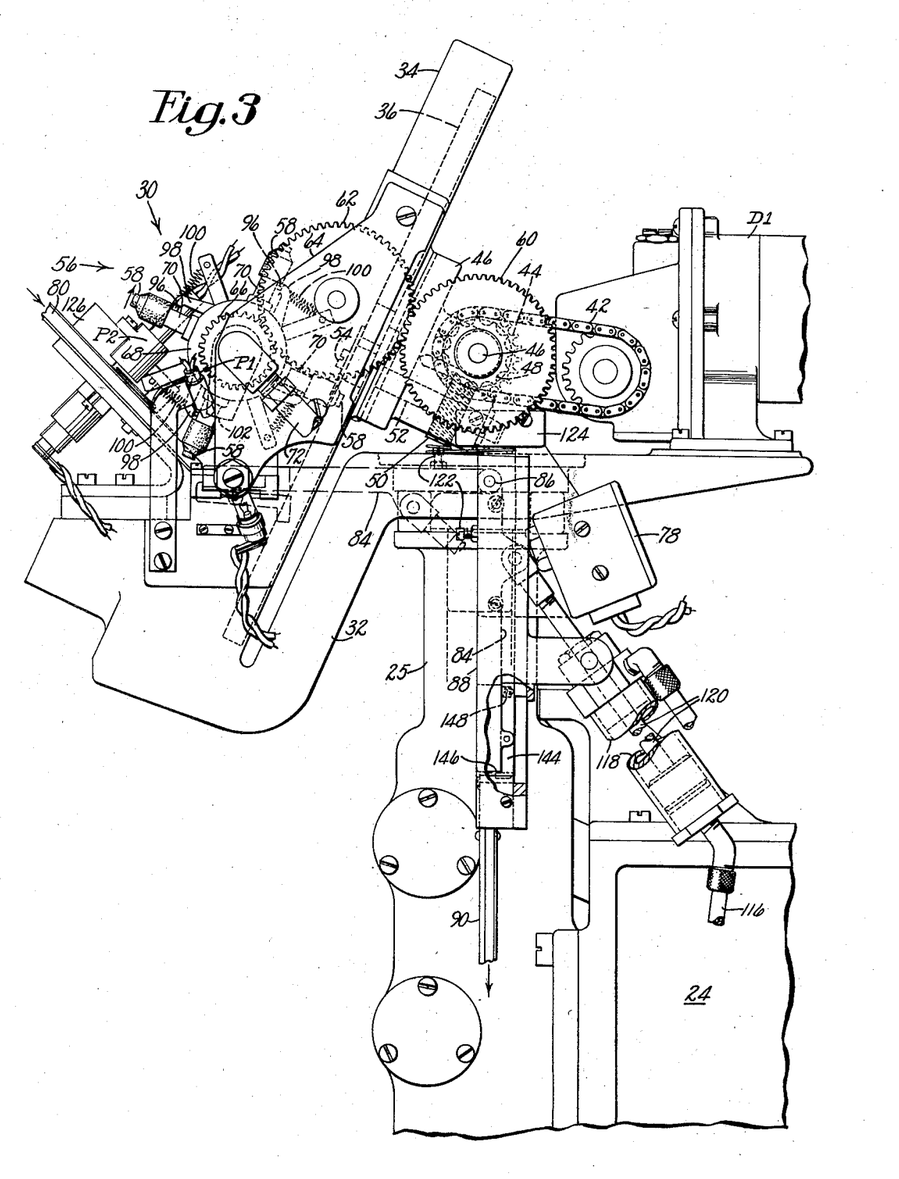
Fig. 3 is a view in side elevation of the upper portion of the head of the machine and including a hopper and associated feed mechanism in rest position.
Figure 4:
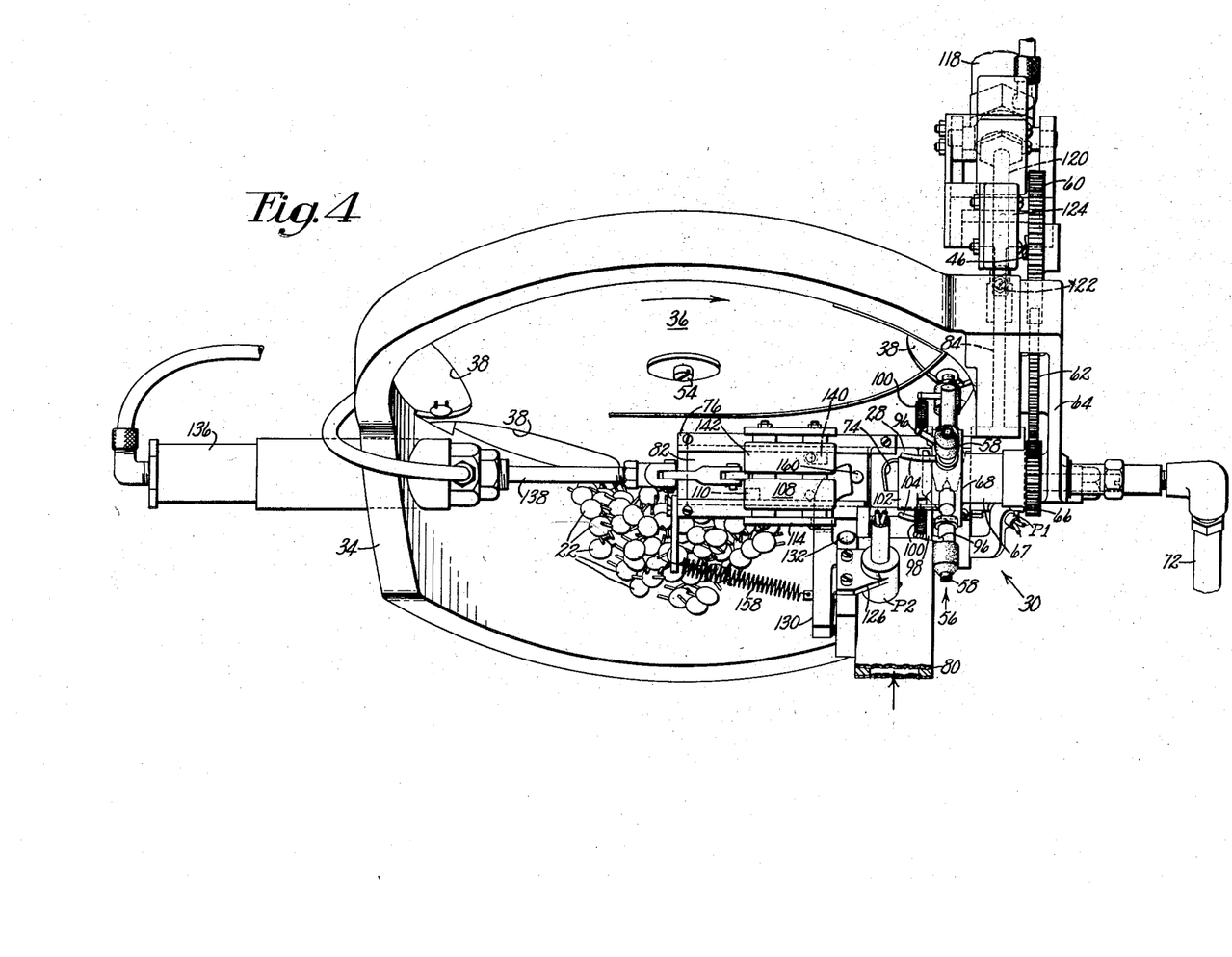
Fig. 4 is a plan view of carrier loading mechanism and transfer means shown in Fig. 3, the transfer lever being shifted to horizontal position.

Mounted at the top of the machine on a bearing formed in the casting 25 is a bracket 32 formed with a cylindrical hopper portion 34 (Fig. 4). An inclined rotary plate 36 in this portion serves as a base or hopper bottom and is formed with a series of equi-spaced recesses 38 (Fig. 4) along its periphery substantially in the manner disclosed in the Newton application above mentioned. As more fully explained therein, successive discaps 22 are segregated from a random mass in the hopper portion and positioned, leads down, in a common pick off point as shown in Fig. 4. For continuously rotating the plate 36 (clockwise as seen in Fig. 4) thus to segregate and position the discaps, a reduction-geared motor D1 (Figs. 1, 3 and 17) mounted on the rear of the bracket 32 is coupled by a chain 42 to a gear 44 (Fig. 3) affixed on a cross shaft 46. The latter has spaced bearings in a casting 46 spanning the portion 34 and is provided with a helical gear 48 (Fig. 3) arranged to mesh with a gear 50 on the lower end of a stub shaft 52 journaled in the casting, the upper end of the stub shaft being secured to the plate 36 by a screw 54.

Figure 1:
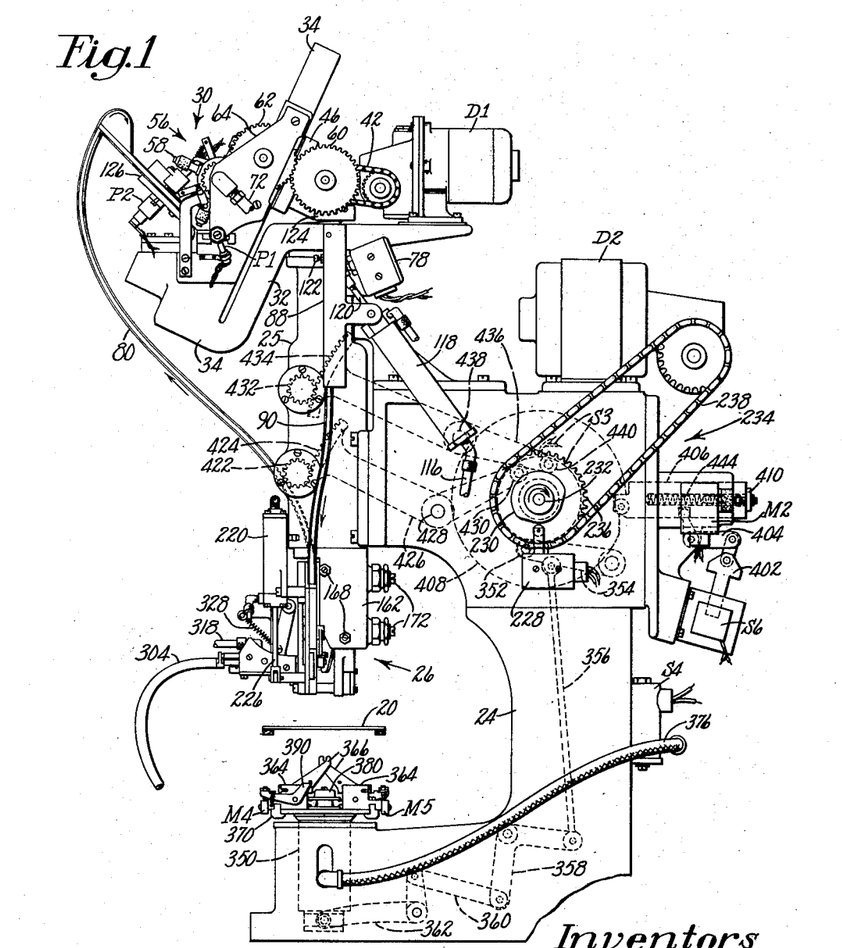
Fig. 1 is a view in side elevation of a machine exemplifying the invention.

It will be recognized that in lieu of the mechanism being explained other forms of segregating and positioning means may be employed in connection with the loading of the carriers 28 without departing from the scope of this invention, but for present purposes it is convenient to employ, in combination with the plate 36, a rotary pick-off wheel generally designated 56 (Figs. 1, 3 and 4). As disclosed in the above-mentioned Newton application, the wheel 56 comprises four equispaced, radially extending pick-off nozzle 58 disposed to transfer from the pick-off point successive discaps arriving thereat in their recesses 38. For this purpose the cross shaft 46 drives a gear 60 meshing with an intermediate gear 62 having bearings in a bracket 64 supported by the hopper portion 34, and the gear 62 in turn drives a pinion gear 66. The wheel 56 is mounted on an axially bored hub 67 (Fig. 4) that is fixedly supported in the bracket 64 and supports the gear 66. A rotor 68 on the hub 67 is driven by the gear 66 and formed at one end with four equally spaced radial bores each of which is threaded rotatably to receive an adapter 70 carrying one of the nozzles 58. For enabling successive discaps at the pick-off point to be successively transferred into successive carriers 28 by the successive nozzles, the bore of the hub and successive ones of the nozzles are in communication with a source of reduced pressure as effected by a pump motor D3 (Fig. 17), by means of a tube 72 (Figs. 1 and 3). By automatic means hereinafter to be explained an empty carrier 28 normally is moved into position beneath the wheel 56 thus to be loaded. A radial aperture (not herein shown) in the hub 67 and communicating with its axial bore is positioned to enable each bore of the rotor 68, while traversing the aperture, to cause the body of a discap to be pressurally held against the outer end of the nozzle 58 until it is over the empty carrier, suction then being effectively terminated to release the discap in a pocket 74 of the carrier. It will be understood that the pockets 74 are formed as cavities appropriate to contain the contour of the components being processed and have shapes bounded by internal positioning surfaces correspondingly to engage and locate the components.

Figures 7, 8:
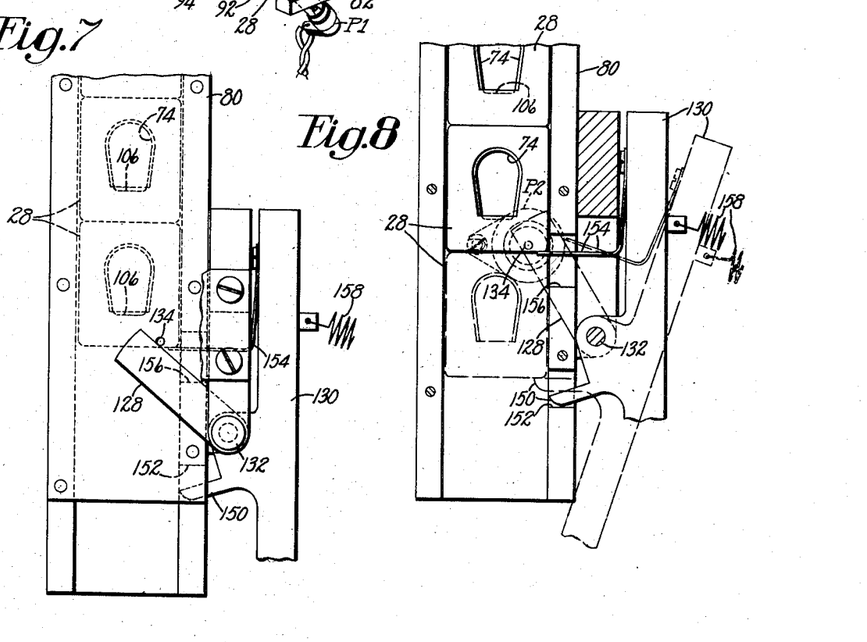
Fig. 7 is a detail view taken normal to the chute shown in Fig. 5 and showing carrier control mechanism.
Fig. 8 is a view corresponding to Fig. 7, but in section and with certain parts in phantom to show a later operating position.

In order to prevent a nozzle 58 from picking up a discap when no carrier 28 therefor has arrived in a carrier guideway 76 (Figs. 4 and 5) in the position immediately adjacent to, and in line with, a just-loaded carrier, a solenoid valve S7 (Fig. 18) is arranged to interrupt suction in the tube 72. This valve is controlled by a switch 78 (Figs. 1, 3 and 18) which is actuatable by means later to be described. The guideway 76 is supported by the hopper portion 34 in position to receive successive empty carriers being returned via a chute 80 (Figs. 1, 4 and 5) from the lower part of the head 26. Assuming now that a series of carriers 28 has been returned in the chute 80, as shown in Figs. 7 and 8, control means about to be explained is employed to regulate their successive discharge or escapement by gravity onto the guideway 76 next to an end of a retracted pusher or plate 82 slidably mounted therein. It is to be noted (Fig. 5) that when a carrier is thus released onto the guideway 76, a preceding carrier 28 normally occupies an end or carrier loading zone of the guideway. The arrangement is such that an operating stroke of the pusher, effected by means to be described, occurs after the preceding carrier has been loaded by the wheel 56, and accordingly concurrently moves the empty carrier on the guideway into the loading zone to be loaded and displaces the loaded carrier to the left (as viewed in Fig. 5). The displaced loaded carrier is received in the open end of a transfer arm 84 (Figs. 3, 4 and 6) pivotally supported at its other end on a horizontal pin 86 fixed in a vertically disposed member 88 U-shaped in horizontal section. The latter is secured on the casting 25 and determines register of the transfer arm 84, by counterclockwise swinging, as viewed in Fig. 3, with the upper end of a delivery chute 90 (Figs. 1, 3, 9 and 10) secured to the member 88 and extending downwardly to the head 26. The transfer arm 84 is operated in time relation to the pusher by mechanism to be explained to receive each displaced loaded carrier and transfer it for downward delivery into the chute 90.

Secured to the guideway 76, just above the loading zone, is a stripper 92 (Fig. 5) provided with a somewhat V-shaped mouth that is adapted to receive the successive rotary nozzles 58, a tongue 94 integral with the stripper being centrally positioned in the mouth to insure that the body of a discap to be loaded into the pocket 74 beneath will be correctly positioned. While for some work it may be unnecessary to rotate the nozzles 58 about their axes in the course of their loading of carriers, it is usually required in order to attain satisfactory positioning of the component with respect to its carrier. For facilitating carrier loading, nozzle rotating means, like that fully disclosed in the above-mentioned Newton application, is accordingly herein shown and will now be briefly described. A "pick-off" position of each adapter 70 is determined by a pin 96 (Fig. 3) therein yieldingly in engagement with a stop arm 98 projecting from the rotor 68, the pin being acted on by means of a spring 100. The spring is connected at one end to the pin 96 and at its other end to a pin fixed in the rotor. A radially depending portion of the hub 67 serves as a fixed cam 102 arranged to be engaged by an angular finger 104 (Fig. 4) projecting from each adapter. Accordingly a picked-off discap, together with its nozzle, is rotated the desired number of degrees against the resistance of the return spring 100 as the finger 104 moves over the arm 102 and the discap leads are thus caused to straddle the tongue 94. The ends of the leads of a loaded discap preferably will be received in a central, straight, V-shaped groove 106 (Figs. 7 and 10) in the base of the carrier pocket 74.

Figures 5, 6:
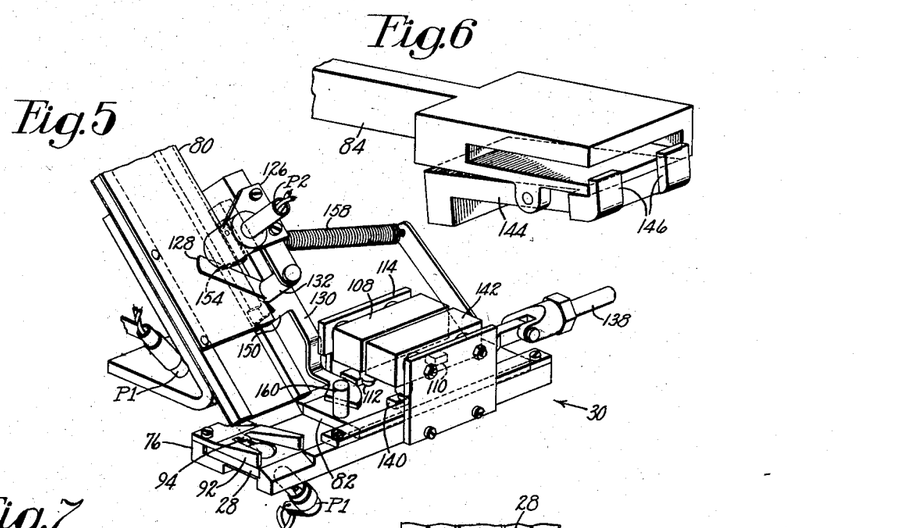
Fig. 5 is a perspective view of the carrier transfer means shown in Fig. 3 and showing discap-and-carrier detecting means.
Fig. 6 is a perspective view of the carrier receiving end of the transfer arm.
Figure 18:
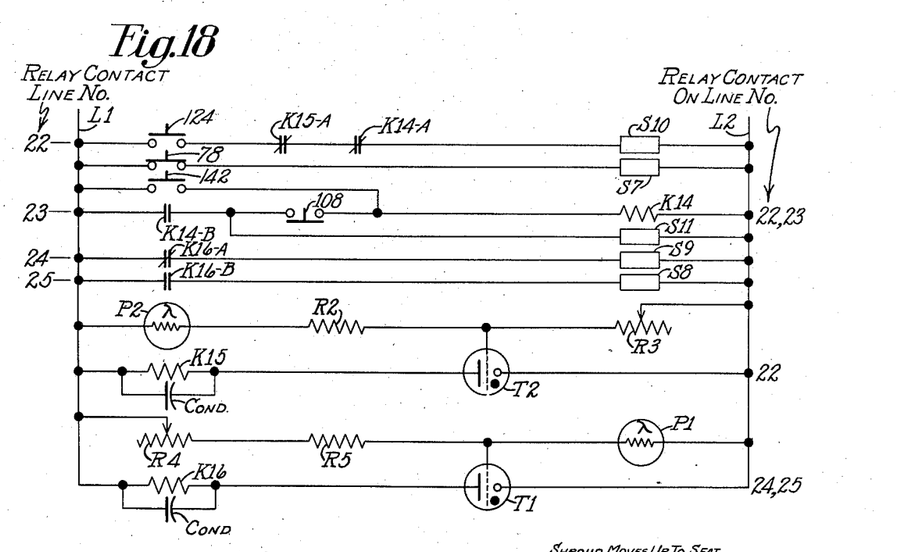
Fig. 18 is a continuation of the diagram of Fig. 17.

Referring more particularly to Figs. 5 and 18, when the electric system is energized and the pusher 82 is in retracted position, as shown in Fig. 5, a pusher-retracted microswitch 108 is allowed to open, a cam 110 on the pusher being withdrawn from engagement with a spring pressed plunger 112 of the switch 108 which is supported by a bracket 114 mounted on the guideway 76. The transfer arm 84, being in the down position when the machine is at rest, engages and closes the switch 78 which energizes the vacuum pick-up solenoid valve S7 (Fig. 18) to supply suction to the pick-off nozzles 58. One of the nozzles thus is effective to transfer a discap to the empty carrier in the loading zone. In doing so a beam of light from a photoelectric cell P1 (Fig. 3, 5 and 18) is blocked, and hence (impedance being suitably obtained by resistances R4 and R5) current flows via thyratron tube T1 (Fig. 18) to energize a relay K16. As a consequence a contact K16–B is closed to energize a solenoid valve S8 for admitting air under pressure via a hose 116 (Fig. 3) into the lower end of a cylinder 118 pivotally supported by the member 88. Concurrently the relay K16 opens a normally closed contact K16–A (Fig. 18) to de-energize a solenoid valve S9 which thereupon opens its exhaust port to allow a piston rod 120 to be moved upwardly in the cylinder 118. The upper end of the rod 120 is pivotally connected to the transfer arm 84. As this arm is thus swung upwardly (to the horizontal phantom position shown in Fig. 3), the switch 78 is allowed to open and, upon reaching an upper limit of movement wherein the transfer arm can receive a carrier laterally displaced from the guideway, a contact screw 122 threaded in the transfer arm closes a microswitch 124 (Figs. 3 and 18) mounted on the bracket 32. A circuit including the switch 124 is accordingly closed to energize a pusher operating solenoid valve S–10, the circuit including normally closed contacts K14–A and K15–A, the latter of which is controlled by the availability of a carrier 28 to be loaded as determined by the operation of a photoelectric cell P2 (Figs. 3–5 and 18). This cell is supported by a bracket 126 on the return chute 80 and arranged to be governed by a light beam if the latter is not occluded by a carrier in the chute 80 or by an arm 128 of an escapement lever 130 (Figs. 4, 5, 7 and 8) pivotally supported at 132 by the bracket 126. The light beam, in the absence of a carrier in the return end of the chute 80 and upon movement of the arm 128 from an obstructing position, is directed through a hole 134 (Figs. 7 and 8) in the chute 80. A resistance R3 (Fig. 18) being suitably adjusted, when light is thus permitted to be directed onto the cell P2, the thyratron tube T2 is a conductor of current energizing a relay K15 so that the contact K15–A is opened and operation of the transfer arm 84 and of the solenoid valve S10 to advance the pusher 82 is prevented; but with the beam occluded by the availability of a carrier or the arm 128, the valve S10 is effective to admit air under pressure into an end of an air cylinder 136 (Fig. 4) secured in the hopper portion 34 and thereby causes a piston rod 138 and the pusher 82 connected thereto to advance the two carriers on the guideway 76 to the limit of the stroke of the rod 138. The loaded carrier is accordingly wholly moved into the raised transfer arm and the unloaded carrier is properly positioned in the loading zone.

In advancing as just described the pusher 82, by means of a cam 140 (Fig. 5) thereon, allows a pusher-forward switch 142 mounted above the guideway 76 to close and the pusher-retracted switch 108 to close. A relay K14 (Fig. 18) is thereby energized and held energized through a now-closed contact K14–B. Closure of the switch 142 also energizes a carrier pusher-return solenoid valve S11, while the contact K14–A is opened by the relay K14 to de-energize the solenoid valve S10 and hence open its end of the cylinder 136 to exhaust. The energized valve S11 admits air under pressure into the opposite end of the cylinder 136 and thereby causes retraction of the rod 138 and the pusher 82 to their starting positions. In the course of the return of the pusher, switch 108 is re-opened, de-energizing the relay K14 and the solenoid valve S11. Light now striking the cell P1 through the empty pocket 74 in the loading zone causes the relay K16 to be de-energized, thus reclosing the contact K16–A and energizing the solenoid valve S9 to cause the transfer arm 84 to be swung to its down position. In order to prevent the loaded carrier in the arm 84 from sliding out in the course of downward transfer, a detent 144 (Figs. 3 and 6) pivotally secured on the arm 84 has tangs 146 yieldingly urged into carrier retaining position by a compression spring 148 (Fig. 3) having its ends nested respectively in the detent and in the arm 84. On reaching the down or delivery position of the arm 84, the detent 144 engages the member 88 to compress the spring 148 and thus permits the transferred carrier to be released by the tangs 146, 146 for descent in the chute 90. The switch 78 is now reclosed by the arm 84 to effect suction at a successive nozzle 58 for the next cycle.

The escapement lever 130 is formed with an arm 150 (Figs. 5, 7 and 8) which extends through an opening 152 in the side of the chute 80 and which is adapted, in the rest position of the machine, as shown in Figs. 5 and 7, to permit the endmost carrier in the chute 80 to advance downwardly onto the guideway 76, an L-shaped arm 154 secured to the lever 130 then extending through an opening 156 in the chute 80 to prevent succeeding carriers from being discharged. A tension spring 158 having one end connected to a bracket affixed to the guideway and its other end connected to the upper end of the lever 130 acts, when permitted by advance or feeding movement of a pin 160 (Fig. 5) in the pusher, to swing the lever 130 clockwise as viewed in Figs. 5, 7 and 8, and thus the arm 154 is withdrawn from carrier engaging position and an endmost carrier is allowed to descend onto the arm 150 in readiness subsequently to be released onto the guideway 76. As indicated by the phantom position of the arm 128 in Fig. 8, its function is to block the light beam to cell P2 in the event no succeeding carrier has arrived to be arrested on the arm 154. By engagement of the pin 160 with the lower end of the lever 130 the latter is returned to starting position in the course of retractive movement of the pusher 82.

*Inserting head*

Figure 11:
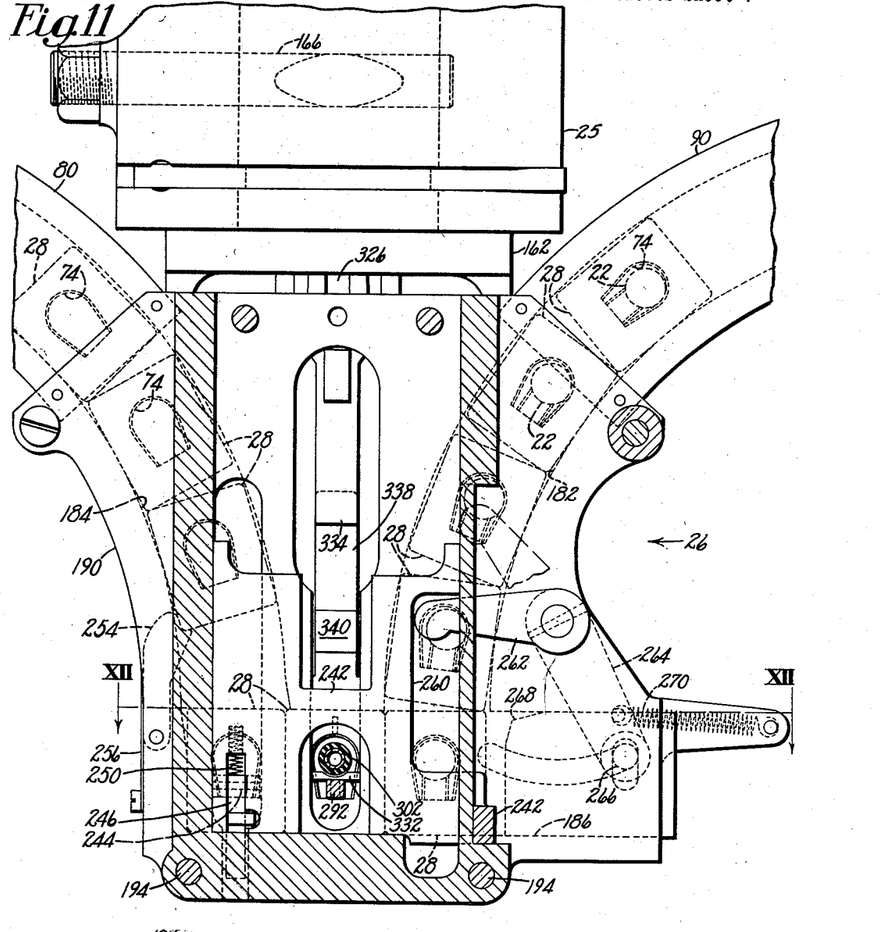
Fig. 11 is a vertical section of the head shown in Fig. 9.
Figure 12:
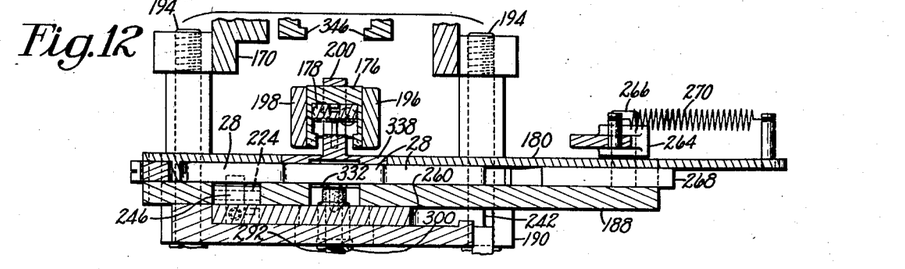
Fig. 12 is a section taken on the line XII—XII of Fig. 11.
Figure 13:
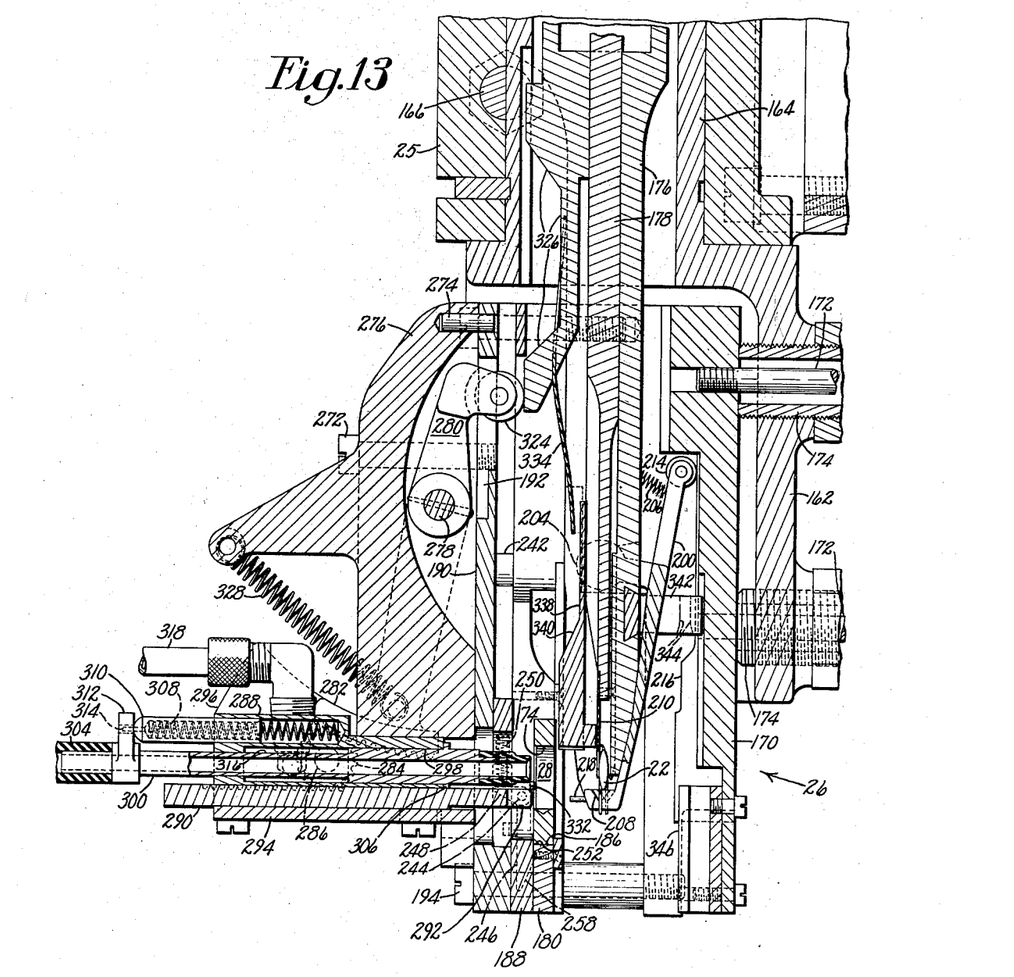
Fig. 13 is a vertical section through the head showing operating parts in their starting position.
Figure 16:
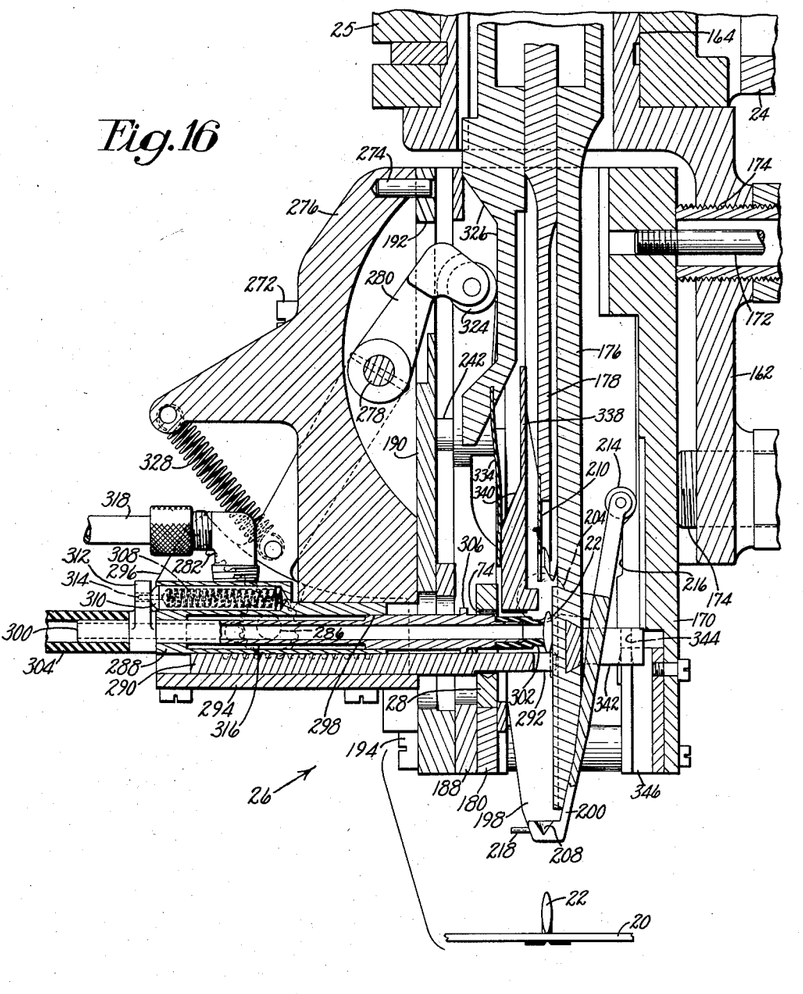
Fig. 16 is a sectional view corresponding to Figs. 13 and 14, but at the still later stage (about 230°) in a cycle when a component has been transferred from a carrier into the operating path of the inserter.

The head 26 (Figs. 9 to 16 inclusive) resembles, in some respects, that disclosed in the above-cited Walsh application and comprises a support 162 (Fig. 13) the upper end of which is formed as a sleeve bearing 164 rotatable in the casting 25. In order that the head 26 may be rotationally adjusted about a vertical axis extending through the inserting means (and coincident with the turning axis of the hopper bracket 32), a bill binder 166 (Fig. 11) threadedly receives a clamping nut and extends into the casting 25 for restraining engagement with the bearing 164 (Fig. 13). Oppositely disposed pairs of setscrews 168 (two only shown in Fig. 1) threaded into the support 162 position a shroud guide block 170 (Fig. 13) accurately after the latter has been clamped into approximate operating position by means of triangularly disposed studs 172 (two only shown in Figs. 1 and 13) threaded into the back of the block 170, the studs freely extending through sleeves 174, respectively, that threadedly extend through the support 162. The rear inner wall of the block 170 is vertically rabbeted slidably to receive a shroud 176 (Figs. 12–16). The latter is U-shaped in horizontal section, as seen in Fig. 12, and provides a vertical guideway for a reciprocable inserter 178 which is movable heightwise with respect to the wiring board 20 in time relation to the shroud 176 by power means, and for purposes hereinafter explained. Secured to the front of the block 170 is a plate-like member 180 (Fig. 10) formed with an arcuate raceway 182 adapted to receive a contiguous series of the loaded carriers 28 from the chute 90, and an arcuate raceway 184 for returning a contiguous series of the empty carriers via the chute 80. Formed in the lower end of the member 180 is a horizontal shelf 186 adapted to support as many as three side-by-side contacting carriers 28 (see Figs. 10, 11 and 12) for step-by-step transfer thereon from a position immediately below the raceway 182 to a position immediately below the raceway 184. The means for effecting this transfer will later be described, it being noted for the present that the middle one of these three carriers is thus in a position from which its discap will be transferred rearwardly into position beneath the inserter 178 which has then been retracted upwardly from the wiring board 20 as shown in Fig. 16 and is in register with the preformed lead receiving holes in the wiring board.

Figures 14, 15:
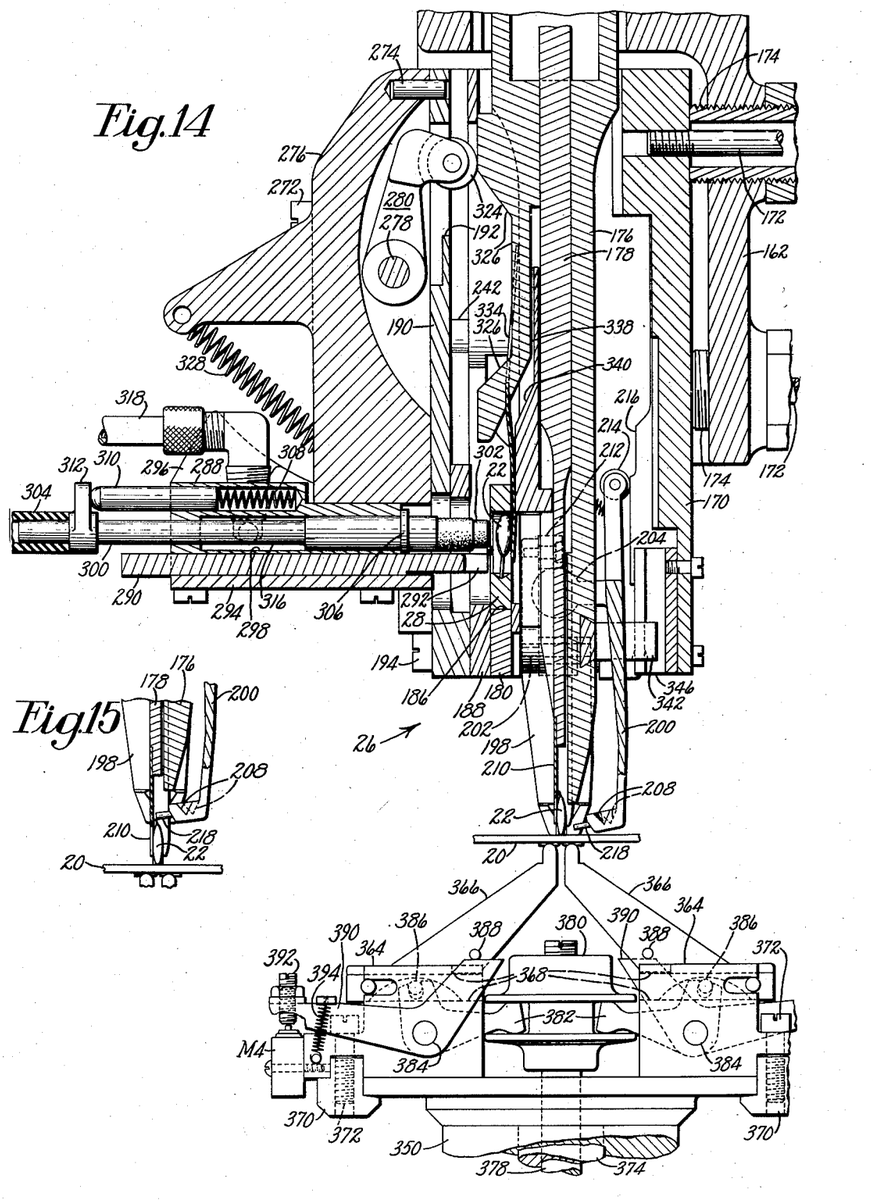
Fig. 14 is a sectional view corresponding to Fig. 13 but at their later stage (about 110°) in a cycle when an inserter has fully descended to mount a component.
Fig. 15 is a detail showing portions of parts seen in Fig. 14 at a later stage (about 130°) and including a pin in the rear lead guide for acting as a holddown.

In front of the member 180 is a spacer plate 188, and a front cover plate 190 (Figs. 9 and 11–16) having an opening 192 is secured to the shroud guide block 170 by means of screws 194. In an arrangement somewhat similar to the construction disclosed in the above-mentioned Walsh application for insuring endwise insertion of the discap leads into their wiring board holes, a pair of side lead guides 196, 198 (Figs. 10–16) and a complemental rear lead guide 200 are provided. The side lead guides are pivotally supported in the shroud 176 on pins 202 (Figs. 10 and 14) respectively, whereas the rear guide is formed with confronting arms having circular bearing portions 204 nested in the shroud. Compression springs 206 (Fig. 10) respectively having an end abutting the shroud also engage upper ends of the lead guides to urge semi-conical lead channels 208 in their lower ends to be moved together to form a pair of closed conical funnels in register with the board lead receiving holes. Fig. 13 indicates the relative positions of the inserter 178 and the lead guides when the machine head is about to commence a cycle of operations, the inserter having descended from its position shown in Fig. 16 along with a clip spring 210 secured thereto to hold a discap to be mounted. It will be noted (Figs. 13 and 19) that the closed lead guides have been moved upwardly to receive and properly space the leads within their channels 208, and thereafter, by power means subsequently explained, the inserter and lead guides move downwardly together with the discap, the guides stopping in engagement with the wiring board at about the 110° point of the cycle as indicated in Fig. 14. The upper ends of the side lead guides 196, 198 respectively carry rolls 212 (Fig. 10) which engage the shroud guide block 170 internally thus to fix the initial lead receiving positions of the channels 208. A roll 214 (Figs. 13, 14 and 16) carried by the upper end of the rear lead guide 200 is engaged by a cam surface 216 (Fig. 14) on the block to retract the rear lead guide from the discap body before its leads are thrust into the board 20 by final downward movement of the inserter. Final inserting movement of the inserter acts to cam the side lead guides outwardly from the discap body. Lead clinching of the leads projecting from the board thereafter normally occurs as will be explained to secure the discap in its mounted position, but to insure that upward retraction of the inserter and its spring clip 210 cannot retract the inserted leads, the rear lead guide 200 has a pin 218 (Figs. 14 and 15) which may extend over the discap body until the inserter and clip are free from it.

*Carrier feeding means*

For moving the successive carriers 28 step by step on the shelf 186 thus to move them into and out of the carrier unloading zone, an air motor 220 (Figs. 1 and 9) is provided. This motor is secured by a screw 222 (Fig. 9) threaded into the shroud guide block 170 and a screw 224 extending into the member 180. A piston rod 226 of the motor 220 is controlled cyclically by a double throw switch 228 (Figs. 1, 2 and 17) arranged to be actuated at the proper time in a machine cycle by a cam 230 (Figs. 1 and 2) secured on the outboard end of a main drive shaft 232 journaled in the frame 24. This shaft also operates the inserting head, as will be described, and is driven through a conventional single-revolution clutch generally designated 234 (Fig. 1), a sprocket 236 on the shaft being continuously driven by a chain 238 operatively connected to a reduction-geared motor D2 (Figs. 1 and 17) on the frame 24. Upon rotation of the cam 230 to actuate the switch 228, a solenoid valve S12 (Fig. 17) is energized causing air under pressure to be admitted into the lower end of the air motor 220. Accordingly, the piston rod 226 of the motor is raised vertically to elevate a somewhat H-shaped slide 242 (Figs. 9, 11 and 12) connected to the lower end of the rod 226. The slide is guided by vertical ways formed in the cover plate 190. Rearwardly projecting ears of the slide 242 carry a pin 244 (Figs. 11–13) on which a lever 246 is pivotally suspended. An arm 248 on the upper end of the lever 246 is engaged by one end of a compression spring 250 the other end of which is nested in the slide, the spring thus normally urging the lever 246 against an empty carrier 28 so that a shoulder 252 (Figs. 10 and 13) of the lever will be enabled to lift the carrier upwardly in the return raceway 184. The elevating of the carrier 28 causes preceding empty carriers, which fill the vertical portion of the return chute 80, to be displaced upwardly by at least the height of a single carrier, an upper endmost empty carrier thus being forced over a curve and into the upper or gravity feed portion of the chute 80. A detent 254 (Figs. 9 and 10) pivoted in the member 180 and yieldingly acted on by a leaf spring 256 serves to hold the elevated carrier as well as those above it in their raised positions. In the course of its subsequent downward stroke the lever 246 is pivoted away from a carrier 28 then on the shelf and in its path by engagement of its cam surface 258 (Fig. 13) with the carrier, the shoulder 252 thereby again assuming its lifting position.

In the latter portion of the upward stroke of the slide 242 the lower end of a recessed portion 260 (Fig. 11) therein engages and lifts an arm 262 of a bell crank lever pivotally supported in a bore extending through the member 180 and the plate 188. Accordingly, an arm 264 of the bell crank lever is swung clockwise as viewed in Figs. 10 and 11 to a position indicated in Fig. 10, a pin 266 projecting from the arm 264 for bearing in a rectangular pusher 268 on the shelf 186 thereby causing the pusher to engage a loaded carrier (to be moved to the left as viewed in Figs. 9 and 10) and slide it a distance equal to its own width into the unloading zone, and concurrently displacing the just unloaded carrier into the now vacant position on the shelf wherein the unloaded carrier in the following cycle may be ejected upwardly by the shoulder 252. The switch 228 now being reshifted by the cam 230 completing its cycle, a solenoid valve S13 (Fig. 17) is re-energized and the solenoid valve S12 is de-energized thus returning the piston rod 226 to its normal down position. The width and height (the latter being equal to the height of each carrier 28) of the pusher 268 are adequate to retain the stack of loaded carriers in the raceway 182 until the pusher is, by reason of the upper end of the recessed portion 260 bearing downwardly on the arm 262, returned to its starting position. An endmost loaded carrier 28 is thereupon permitted to descend onto the shelf 186. A tension spring 270 (Figs. 9–12) having one end connected to a lateral projection of the member 180 is connected at its other end to the pusher 268 to insure its full return.

Carrier unloading mechanism

Figure 9:
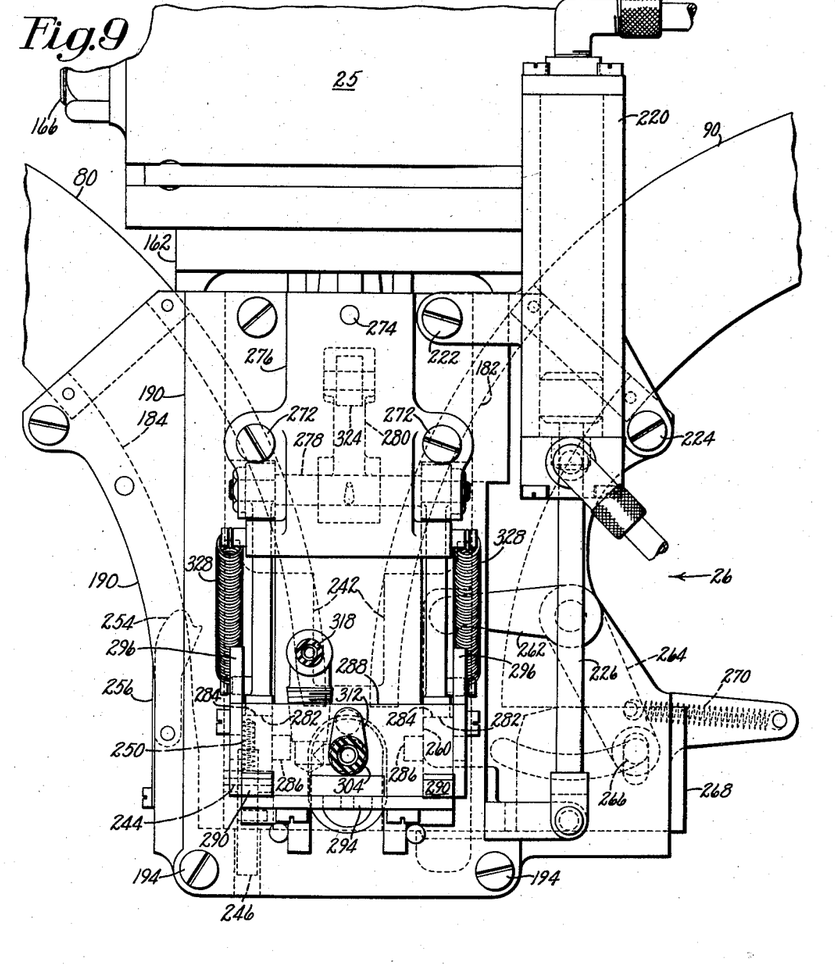
Fig. 9 is a view in front elevation of the lower portion of the machine head, carrier transfer parts being shown in their starting position.

For removing successive discaps 22 from their carriers 28 when the latter are in unloading position on the shelf 186 and transferring the discaps into the operating path of the inserter 178, electrically controlled pneumatic means now to be described is employed. A pair of screws 272 (Figs. 9 and 13) and a dowel pin 274 secure a fulcrum block 276 to the front of the cover plate 190. A pivot pin 278 in the block 276 supports a lever 280, the lower portion of which is forked and formed to provide a pair of segment gears 282, 282 (Fig. 9) respectively arranged to mesh with pinion gears 284, 284 mounted on the outer ends respectively, of coaxial shafts 286, 286 (Fig. 9). These shafts are journaled in the sides of a block 288 secured to the block 276, and the pinion gears are in mesh with racks 290, respectively, slidable horizontally toward and from the unloading zone. The racks 290 are integral with a U-shaped shelf having a rearwardly projecting narrow center portion 292 (Figs. 14 and 16) disposed, in the course of its rearward movement, to come between the leads of the discap to be unloaded and thus support its body. A retainer plate 294 secured to the under side of the block 288 supports the racks 290 heightwise, and a plate 296 secured on each side of the block 288 confines the pinion gears against axial movement and serves to guide and retain the racks in their operating path.

Figure 17:
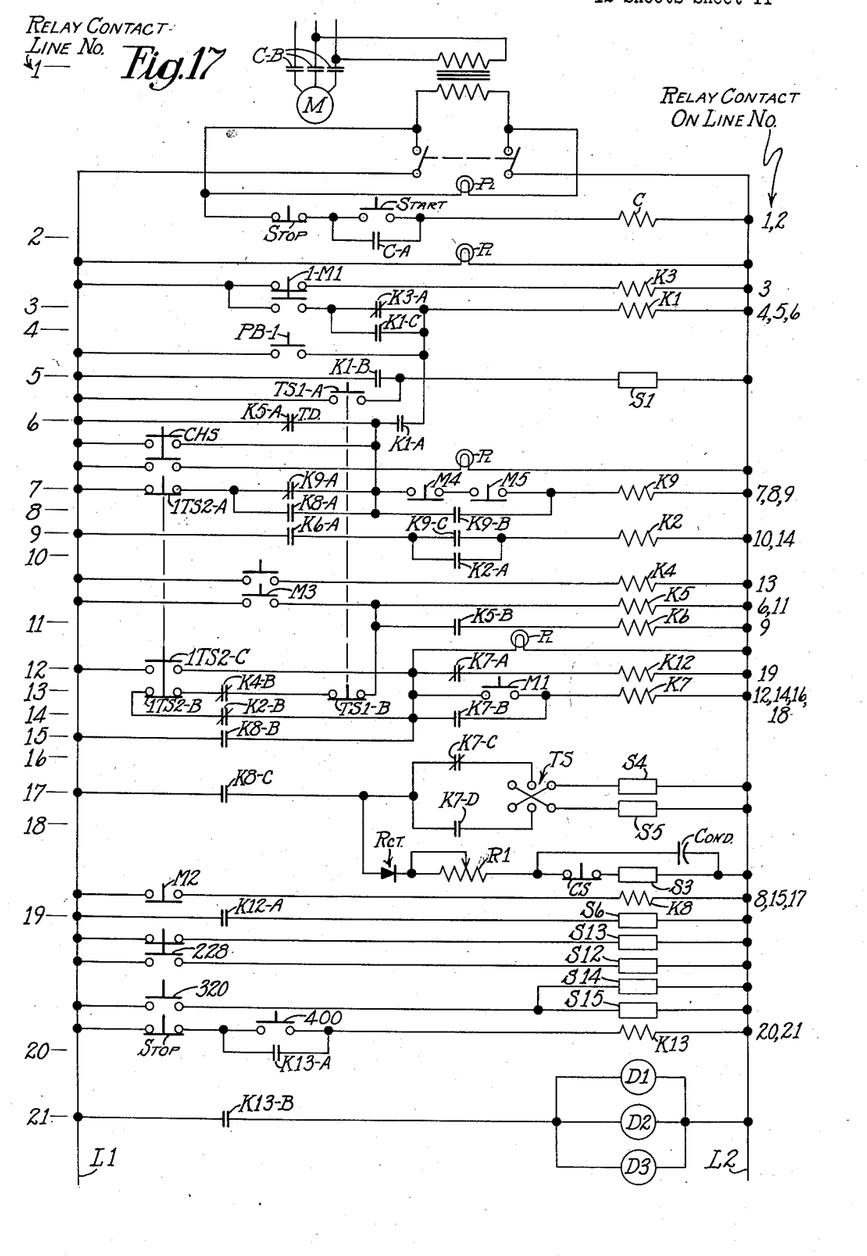
Fig. 17 is an electrical diagram of the machine in rest condition and some of its controls as adapted for operation in a conveyerized system.
Figure 19:
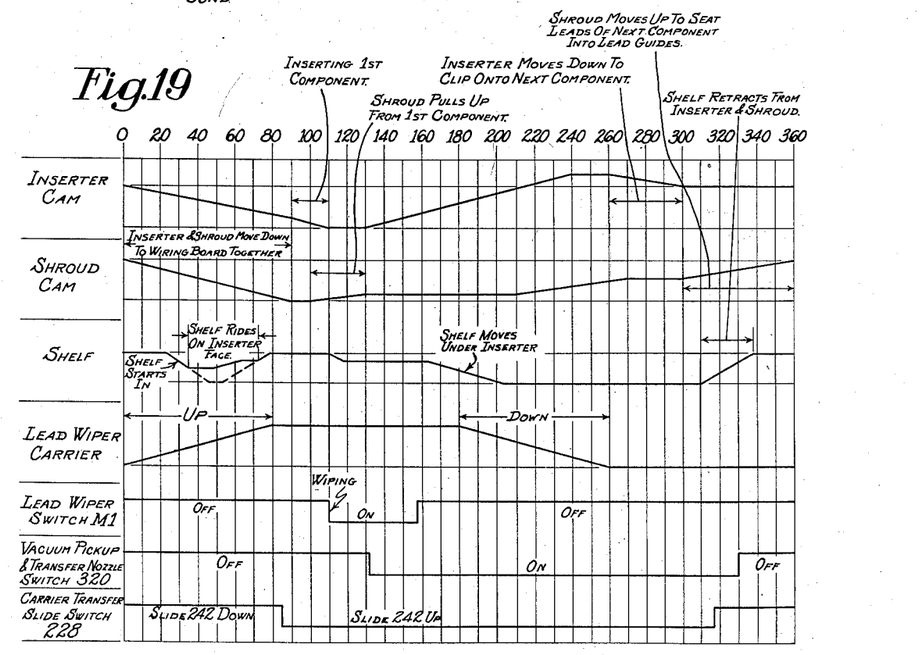
Fig. 19 is a timing chart of principal operating parts of the machine.

The block 288 is formed with a bore 298 for accommodating a horizontally reciprocable nozzle 300 (Figs. 13, 14 and 16) having a rubber tip 302 at one end which is adapted to engage and transfer a discap body by suction. The other end of the nozzle 300 is connected by a hose 304 to a source of reduced pressure (as attained for instance by a pump motor D3) which is controlled by a solenoid valve S14 (Fig. 17). The inoperative position of the nozzle is determined by a collar 306 (Fig. 14) thereon arranged to abut the rear face of the block 288. For normally holding the nozzle in the inoperative position a compression spring 308 nested in the block 288 urges a plunger 310 to bear on a lug 312 on the nozzle. A pin 314 in the plunger 310 is received in a hole in the lug 312 to prevent rotation of the nozzle. To shift the nozzle rearwardly against the resistance of the spring 308 and in proper time relation to movement of the shelf 292, a portion 316 of the nozzle within the bore 298 is of reduced external diameter thus affording a chamber in communication with a hose 318 connected to a source of air under pressure. Accordingly, for effecting rearward movement of the nozzle which thus acts as a piston, a solenoid valve S15 (Fig. 17) is arranged to be energized to admit air under pressure to the chamber via the hose 318. The valves S14 and S15 are simultaneously energized upon closure of a switch 320 (Figs. 2 and 17) arranged to be actuated at the proper time in a cycle (about 132° as shown in Fig. 19) by a cam 322 on the main shaft 232. For effecting rearward and subsequent return movement of the shelf 292 in desired relation to the corresponding movements of the nozzle 300 (as indicated in Fig. 19), the upper end of the lever 280 projects through the opening 192 in the cover plate 190 and carries a roll 324 (Figs. 9, 13, 14 and 16) disposed to engage a somewhat shallow U-shaped cam 326 formed integrally with the front of the shroud 176. Tension springs 328, 328 (Figs. 9, 13 and 16) respectively having one end connected to the lower ends of the lever 280 and the other end secured to the block 276 yieldingly maintain the roll 324 in engagement with the cam 326.

In order that the discap in the carrier positioned in the unloading zone may not at any time come forward out of its pocket 74, a small bar 332 (Figs. 11, 12 and 13) extends across an opening in the spacer plate 188 and is just beneath the path of the nozzle 300. For preventing the same discap from prematurely coming rearwardly out of the pocket, a spring blade 334 (Figs. 10, 13, 14 and 16) is suspended by its confronting ears 336 (Fig. 10) respectively formed in the forked upper end of the blade and received in recesses in the shroud 176. At the start of a cycle the lower portion of the blade 334 is above the carrier unloading zone as shown in Fig. 13, but is lowered with the shroud as indicated in Fig. 14 largely to close the rear opening of the pocket 74, a central part 338 (Figs. 12 and 14) secured to the member 180 having a cam surface 340 (Fig. 13) adapted to guide the descending blade into its discap engaging position. As shown herein (Fig. 19), there is a portion of a cycle of the machine in which the shelf 292 rides on a vertical front face of the inserter 178 and thereafter, the inserter having risen as shown in Fig. 16, the shelf together with an unloaded discap carried rearwardly by the nozzle 300 will bear on an inner face of the shroud. To counter such thrust and give good control at insertion a rearward projection 342 (Figs. 13 and 16) dovetailed in the shroud is formed with vertical slots 344 adapted to receive the inturned flanges of a shroud guide 346 secured to the shroud guide block 170.

Clinching mechanism

After the leads of a discap have been thrust endwise through their lead receiving holes in the board 20 by the inserter 178 as above mentioned, any suitable means may be employed to bend them against, or nearly against, the under side of the board so that the discap will be mechanically secured and its electrical connection with a circuit may be effected. Illustrative clinching means shown herein (Figs. 1 and 14) resembles in many respects that fully disclosed in a copending application Serial No. 612,453, filed September 27, 1956, in the name of John E. Walsh, and accordingly a somewhat brief explanation of the clinching mechanism will suffice for present purposes. For raising a lead wiper carrier 350 (Figs. 1, 14 and 19) in the base of the frame 24 at the proper time, i. e., prior to lead insertion as indicated in Fig. 19, the main shaft 232 carries a cam (not shown) cooperative with a roller 352 (Fig. 1) borne by the upper end of an arm 354 pivoted to the frame. This arm is arranged to actuate the carrier 350 by connecting linkage consisting of a link 356, a bell crank 358, a link 360, and a bell crank 362, the cranks 358 and 362 pivoted in the frame. When the carrier 350 is thus raised, oppositely disposed blocks 364, 364 (Figs. 1 and 14) thereon carry lead-engaging convexly grooved upper ends of wiper anvils 366, 366, respectively, nearly into engagement with the under side of the board 20. Each lead engaging end is appropriately offset from the other and radially movable in either of two directions across an axis coincident with that of the adjacent unclinched protruding lead, the lower or base portion of the anvils being slidable somewhat loosely in ways 368 (Fig. 14) formed in the blocks 364 respectively. To permit the anvils to be operated in any selected radial direction, much as disclosed in the cited Walsh application Serial No. 612,453, the blocks 364 are each adjustably secured to the circular periphery of the carrier 350 by a clamp 370 which receives a screw 372 threaded through a radially projecting arm of the block.

By automatic means about to be explained the anvils will either be moved outwardly from the discap or inwardly thereof to bend and wipe the leads simultaneously in the selected directions. A cylinder 374 (Fig. 14) within the carrier 350 has the lower end of a chamber (not shown) in communication with a source of air under pressure via a hose 376 (Fig. 1) and the upper end of the chamber is in communication with another hose (not shown) on the opposite side of the machine. A piston rod 378 (Fig. 14) in the cylinder 374 is accordingly forced upwardly or downwardly depending on the selected position of a double throw toggle switch TS (Fig. 17) which is arranged optionally to energize a solenoid valve S4 or S5 (only S4 shown in Fig. 1). As shown in Fig. 14, if the rod 378 is forced upwardly an actuator 380 on its upper end rocks a pair of bell cranks 382, 382 on their respective pivot pins 384 in the blocks 364. A yoked arm of each bell crank 382 receives a pin 386 integral with the wiper anvils 366, respectively, and they are accordingly spread apart to clinch outwardly. The function of a normally closed contact K7-C (Fig. 17) is to insure that the rod 378 is preliminarily shifted up or down to enable a clinching structure to be made inwardly or outwardly. In the course of the clinching stroke the anvils are slightly depressed by the lead engagements, and hence pins 388 (Fig. 14) in the anvils, respectively, are caused to bear downwardly on the upper ends of levers 390 respectively pivoted on the pins 384. As a consequence a setscrew 392 in each of the levers 390 is swung out of contact with adjacent microswitches M4 or M5 (Figs. 1, 14 and 17) thus allowing them to close, for a purpose subsequently explained, until tension springs 394, 394 respectively connecting the levers 390 to their adjacent block 364 reopen the switches M4 and M5 after the clinching.

*Drive mechanism and controls therefor*

Assuming the machine to be in the conveyor control system above mentioned and shown in Figs. 17 and 18 in de-energized condition, to initiate a cycle a starting switch 400 (Fig. 17) is momentarily closed to energize a coil K13 thus closing contacts K13-A and K13-B. The coil K13 is held energized by the now closed contact K13-A and the motors D1, D2, and D3 associated with the illustrative machine are now energized through the closed contact K13-B. For performing a cycle of operations the shaft 232 is coupled by energization of a D. C. clutch coil S3 (Figs. 1 and 17) to the sprocket 236. The energizing of the coil S3 occurs as a result of certain intermediate steps now to be noted. A switch M3 of the conveyor system is closed as a consequence of the boards 20 arriving in component receiving positions in their respective stations. A relay coil K12 is thus energized through a conveyor circuit including the switch M3, a switch TS1-B, a normally closed contact K4-B, a switch 1TS2-B, and normally closed contacts K2-B and K7-A. Hence a contact K12-A is closed to energize a solenoid valve S6 (Figs. 1 and 17). Resultant movement of a plunger 402 (Fig. 1) actuates a frame supported bell crank 404 one arm of which accordingly shifts a spring pressed slide 406 to the right as viewed in Fig. 1 to unlatch a clutch plate 408, and similarly shifts a cross arm 410 of the slide to allow a switch M2 (Figs. 1 and 17) to close and thus energize a relay K8. Contacts K8-A, K8-B and K8-C are thereby closed, the coil S3 then being energized through a circuit including the contact K8-C, a rectifier RCT, a resistor R1, and a clutch switch CS. The main shaft 232 is rotated through a single revolution to complete a cycle of operations.

For actuating the inserter 178 and the shroud 176 heightwise in proper time relation, power means now to be explained is provided. The inserter is bored to receive a coupling pin 412 (Fig. 10) extending in a vertically disposed slot 414 formed in a tubular extension 416. Though not shown herein, the extension 416 is externally formed with circular rack teeth as disclosed in the above cited Walsh application and is capped to confine a safety compression spring 418 bearing on the inserted normally to hold its pin 412 against the lower end of the slot 414. The shroud 176 is coupled to a hollow, cylindrical shroud operating rack 420 (Fig. 10) which, like the just-mentioned inserter rack operating teeth, is movable heightwise in the casting 25. The rack 420 is arranged to mesh with a pinion gear 422 (Fig. 1) having bearings in the casting 25, and the gear 422 is in mesh with a segment gear 424 formed on one end of a lever 426 pivotally supported at 428 in the frame 24. The other end of the lever carries a roll 430 arranged to be received in a closed cam (not shown) in the clutch plate 408. In similar manner the aforementioned rack teeth on the inserted extension 416 mesh with a pinion 432 (Fig. 1) which is also in mesh with a segment gear 434 formed on one end of a lever 436 pivoted at 438 in the frame 24. The other end of the lever 436 carries a roll 440 disposed in an inserter-controlling cam slot (not shown) in the plate 408.

Figure 2:
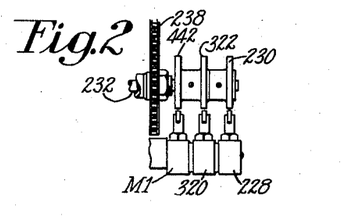
Fig. 2 is a view in front elevation of certain controls shown only partially in Fig. 1.

The inserter having moved down in a cycle to effect insertion of a properly oriented discap received from the nozzle 300, a cam 442 (Fig. 2) on the shaft 232 actuates a wiper clinch timing switch M1 (Figs. 1, 2 and 17). As a result a relay coil K7 is energized through the previously closed contact K8-B. The contact K7-A thereupon opens and contacts K7-B and K7-D close, coil K7 then being held energized through closed contacts K7-B and K8-B. The coil K12 is now de-energized by the opening of the contact K7-A, and hence the contact K12-A is reopened to de-energize the solenoid S6 and allow the slide 406, under the influence of a return spring 444 (Fig. 1), to latch with the clutch plate 408 upon completion of a revolution to end a cycle. The closure of the contacts K8-C and K7-D completed a circuit energizing the solenoid S4 or S5 to cause air to be delivered to the selected upper or lower end of the chamber in the cylinder 374 and thus operated the anvils 366 to clinch the protruding leads inwardly or outwardly. As has been indicated the switches M4 and M5 are normally closed in the course of lead clinching until opened by the springs 394. Their closure energizes a relay coil K9 (Fig. 17) of the conveyor system and the coil is held energized through the now closed contacts K8-A and K9-B to complete a circuit through a contact K1-A which was closed upon clamping of the several boards 20 in their respective conveyor stations by an energized relay K1. The reopening of the switches M4 and M5 breaks this clamping circuit. If, however, the switches M4 and M5 fail to be closed because, for instance, no clinching of either lead was occurring or no discap had been inserted to be clinched, the relay K1 will not be de-energized and hence the conveyor system remains "clamped up," i. e., the boards 20 are not permitted to advance to another station until corrective action is taken.

It will be apparent from the foregoing description that the invention provides an automatic and reliable machine by which, with a minimum of operator attention, discaps or the like may be accurately fed from a mass for loading into jam-free carriers and then individually positioned and controlled to enable them successively to be properly mounted.

Having thus described our invention, what we claim as new and desire to secure by Letters Patent of the United States is:

1. A machine for successively mounting in a work piece electrical components of the type having terminations projecting from corresponding surfaces thereof which comprises a reciprocable inserter, a plurality of indedendently movable carriers, said carriers being of substantially similar shape and respectively adapted to receive, hold, and release individual, similarly positioned components, means for loading the carriers successively at a receiving zone adjacent to a supply of the components, mechanism for circulating the carriers in sequence over a closed path in which they are confined, said path including said receiving zone and a release zone adjacent to the operating path of the inserter, means adjacent to the release zone for transferring from successive carriers therein the components to be mounted by the inserter, and means for operating said carrier circulating mechanism alternately with operations of the loading means and the transfer means.

2. In a machine for mounting components, a plurality of discrete carriers respectively formed with a cavity for containing a component to be mounted, said carriers being of similar external configuration and being provided with internal positioning surfaces correspondingly to engage and locate a component within the cavity, and means for successively feeding said carriers step by step in a closed path between a zone in which the components are loaded into the carriers and a zone in which the components are unloaded from the carriers for mounting, the feeding means including a lost motion mechanism effective between component mountings for returning unloaded carriers one step and then advancing the loaded carriers another step.

3. In a machine for mounting the leads of components in a work support, an inserter movable toward and from the work support in a predetermined path, a plurality of independent carriers respectively adapted to hold a component with its leads extending in predetermined position, means defining a closed path for guiding the carriers successively toward and from the path of the inserter, means adjacent to the closed path for loading successive empty carriers with their respective components, and means for transferring the components from successive loaded carriers into the operating path of the inserter when the latter is retracted from the work support.

4. In a machine having a reciprocable inserter for thrusting the leads of components into work supports, a plurality of carriers for individually containing the components, means for guiding successive carriers from a zone in which they receive the components to a zone in which their components are unloaded for transfer to said inserter, and mechanism for recirculating the carriers into and out of said unloading zone in accordance with the operating rate of the inserter.

5. A machine as set forth in claim 4, and further characterized in that transfer means is mounted for movement through each carrier at said unloading zone to deliver its component into the path of the inserter and then retracted from the carrier prior to its advance from the unloading zone.

6. A machine as set forth in claim 4, and further characterized in that loading means is provided adjacent to said carrier guiding means for correspondingly positioning a component within an empty carrier each time a carrier is unloaded for transfer to the inserter.

7. A machine as set forth in claim 6, and further characterized in that control means are provided for automatically interrupting cyclical movement of the inserter if no component is loaded by the loading means or no carrier is available to receive a component from the loading means.

8. In a machine having an inserter for mounting components on work supports, a hopper for holding a supply of the components to be mounted, means defining a closed path for guiding a row of contacting carriers from a loading zone adjacent to the hopper to an unloading zone adjacent to the path of the inserter and return, said carriers being substantially identical in shape and adapted to hold the respective components in corresponding position, mechanism adjacent to the hopper for loading components in successive carriers in the loading zone, means for operating the inserter cyclically, and power means operable in time relation to the inserter operating means for returning empty carriers contiguously in the carrier guiding means and then advancing loaded carriers in the unloading zone by a step equivalent to a linear dimension thereof.

9. A machine as set forth in claim 8, and further characterized in that escapement means are mounted in said carrier guiding means to control the rate of return of the empty carriers to said loading mechanism in accordance with the rate of operation of said inserter.

10. In a component mounting machine of the type having a reciprocable inserter for thrusting the leads of successive components into work supports, a frame, guide means on the frame for circulating a series of independent carriers from a loading zone to an unloading zone adjacent to the operating path of the inserter, each of said carriers being of similar configuration and adapted similarly to hold a component, means operable in said loading zone to place a component in successive empty carriers, the guide means including an oscillatory portion movable toward and from the carrier loading means to convey loaded carriers in accordance with the rate of operation of the inserter, and control means actuated by said oscillatory portion for rendering the loading means inoperative until a carrier has returned in the guide means to the loading zone.

No references cited.